United States Patent [19]

Jackson et al.

[11] 4,386,533

[45] Jun. 7, 1983

[54] CAPACITANCE TRANSDUCER

[75] Inventors: Jeffrey A. Jackson, Urbana, Ill.; Douglas J. Kluge, Golden Valley; Gary R. Bluem, Wayzata, both of Minn.; Eugenio Espiritu Santo; Carl E. Kittle, both of Cedar Falls, Iowa

[73] Assignee: Deere & Company, Moline, Ill.

[21] Appl. No.: 228,440

[22] Filed: Jan. 26, 1981

[51] Int. Cl.³ .............................................. G01L 1/14
[52] U.S. Cl. .................................. 73/862.64; 73/780; 361/283
[58] Field of Search ........... 73/862.57, 862.63, 862.64, 73/780, 718, 724; 210/210 C; 361/283, 290

[56] References Cited

U.S. PATENT DOCUMENTS

| 1,528,627 | 3/1925 | Peters. |
| 2,520,923 | 9/1950 | Franzel et al. |
| 2,550,588 | 4/1951 | Oberholtzer. |
| 2,576,488 | 11/1951 | Stovall, Jr. et al. |
| 2,576,489 | 11/1951 | Stovall, Jr. |
| 2,753,515 | 7/1956 | Rickner. |
| 2,924,970 | 2/1960 | Samsel et al. |
| 2,962,893 | 12/1960 | Ormond. |
| 3,073,155 | 1/1963 | Ianuzzi. |
| 3,142,981 | 8/1964 | Gross .......................... 73/862.64 X |
| 3,297,971 | 1/1967 | Gindes. |
| 3,678,378 | 7/1972 | Trott et al. |
| 3,695,100 | 10/1972 | Mitchell. |
| 3,732,553 | 5/1973 | Hardway, Jr. |
| 3,814,188 | 6/1974 | Ahne. |
| 3,995,696 | 12/1976 | Kainer et al. |
| 4,320,667 | 3/1982 | Forrester et al. ................ 73/862.64 |

FOREIGN PATENT DOCUMENTS

| 1285762 | 8/1972 | United Kingdom ................. 73/780 |
| 1470591 | 4/1977 | United Kingdom ................. 73/780 |

OTHER PUBLICATIONS

Specification Literature from "National Semiconductor" for its LM231A Voltage-to-Frequency Converter.

*Primary Examiner*—Charles A. Ruehl

[57] ABSTRACT

A load transducer for sensing longitudinal tension includes a pair of deformable members with spaced-apart central portions, the spacing between which varies as a function of the longitudinal tension applied to the ends of the deformable members. The plates of a variable parallel plate capacitor are carried by insulating supports attached to each of the central portions. Alignment rods maintain the plates in parallel alignment. A circuit produces an output signal with a frequency proportional to the tension sensed by the draft sensor.

10 Claims, 3 Drawing Figures

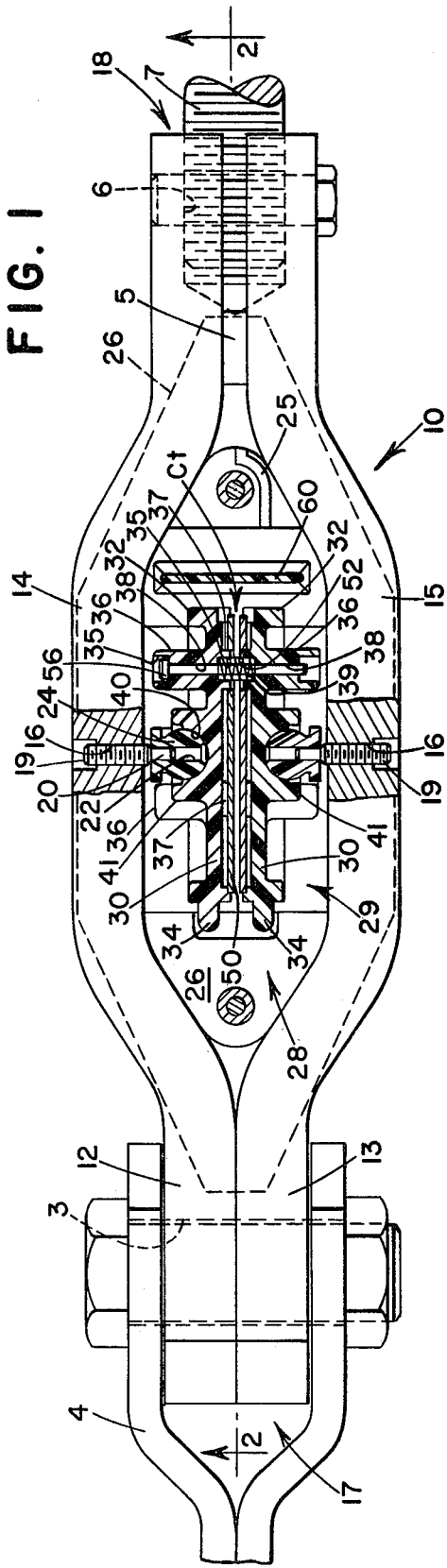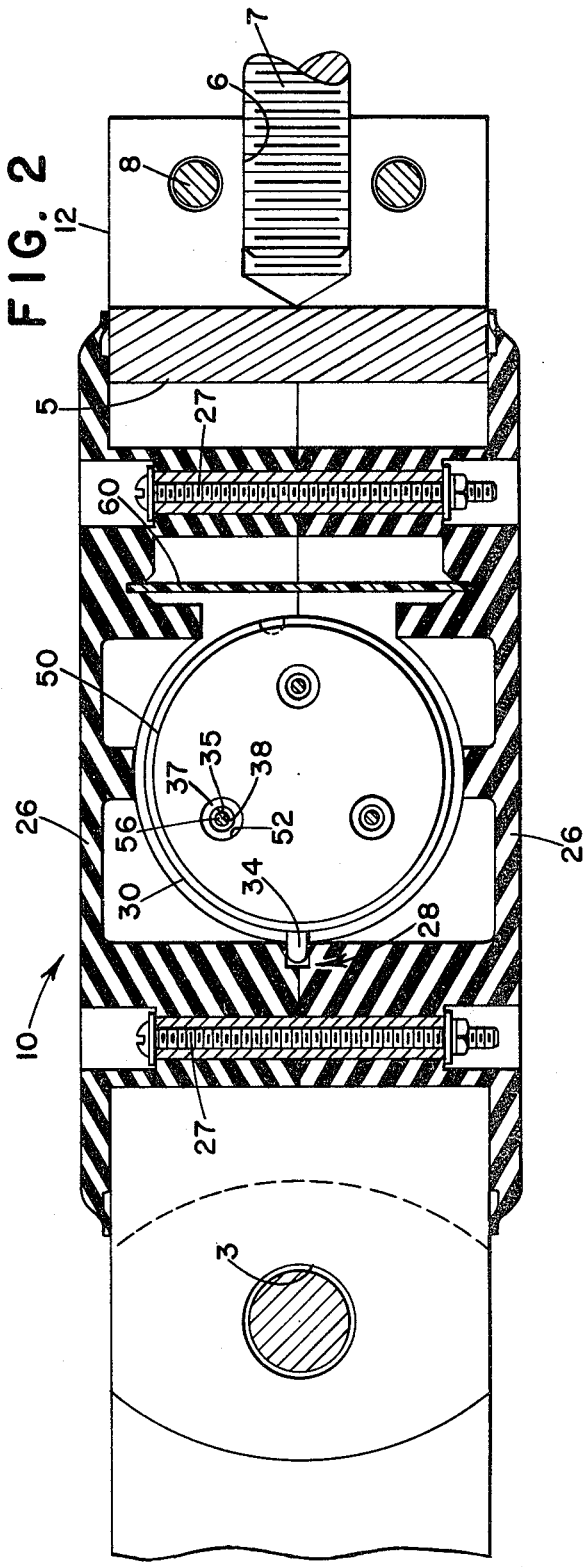

CAPACITANCE TRANSDUCER

BACKGROUND OF THE INVENTION

This invention relates to a capacitive load transducer for measuring the amount of tension in a linkage.

Resistance-type strain gauges have been used to detect the draft loads in a tractor hitch, such as disclosed in U.S. Pat. No. 3,814,188. Such strain gauge sensors have suffered from a lack of sensitivity, temperature stability and durability. A dual capacitor draft sensor, with analog signal conditioning circuitry, is disclosed in U.S. Pat. No. 3,995,696. This draft sensor proved costly due to the required number of capacitor plates and the structure of its shaft-like strain member.

SUMMARY OF THE INVENTION

It is an object of this invention to provide an improved draft sensor with a simpler and less expensive strain member structure.

It is another object of this invention to provide a draft sensor of the capacitive type with only a single variable capacitor.

A further object of this invention is to provide a capacitive draft sensor with signal conditioning circuitry which may be easily interfaced with a digital control system.

These and other objects are achieved, according to the present invention, in that it provides an electronic capacitive draft sensor with a single variable capacitor. A pair of deformable members include spaced-apart central portions. The transverse spacing between the central portions varies according to the longitudinal tension applied to the ends of the deformable members. Separate disc-shaped supports are pivotally attached to each central portion via ball and socket connections. Each support holds a metal capacitor plate in spaced-apart relationship to each other. Rods cooperate with bores in the supports to maintain the capacitor plates in parallel alignment. A signal-conditioning circuit utilizes a commercially available voltage-to-frequency converter to obtain an output signal with a frequency which is proportional to the tension applied to the draft sensor.

BRIEF DESCRIPTION OF THE DRAWINGS

FIG. 1 is a partial cross-sectional view of applicants' draft sensor;

FIG. 2 is a cross-sectional view of applicants' draft sensor along lines 2—2 of FIG. 1;

DETAILED DESCRIPTION

Figure 3:
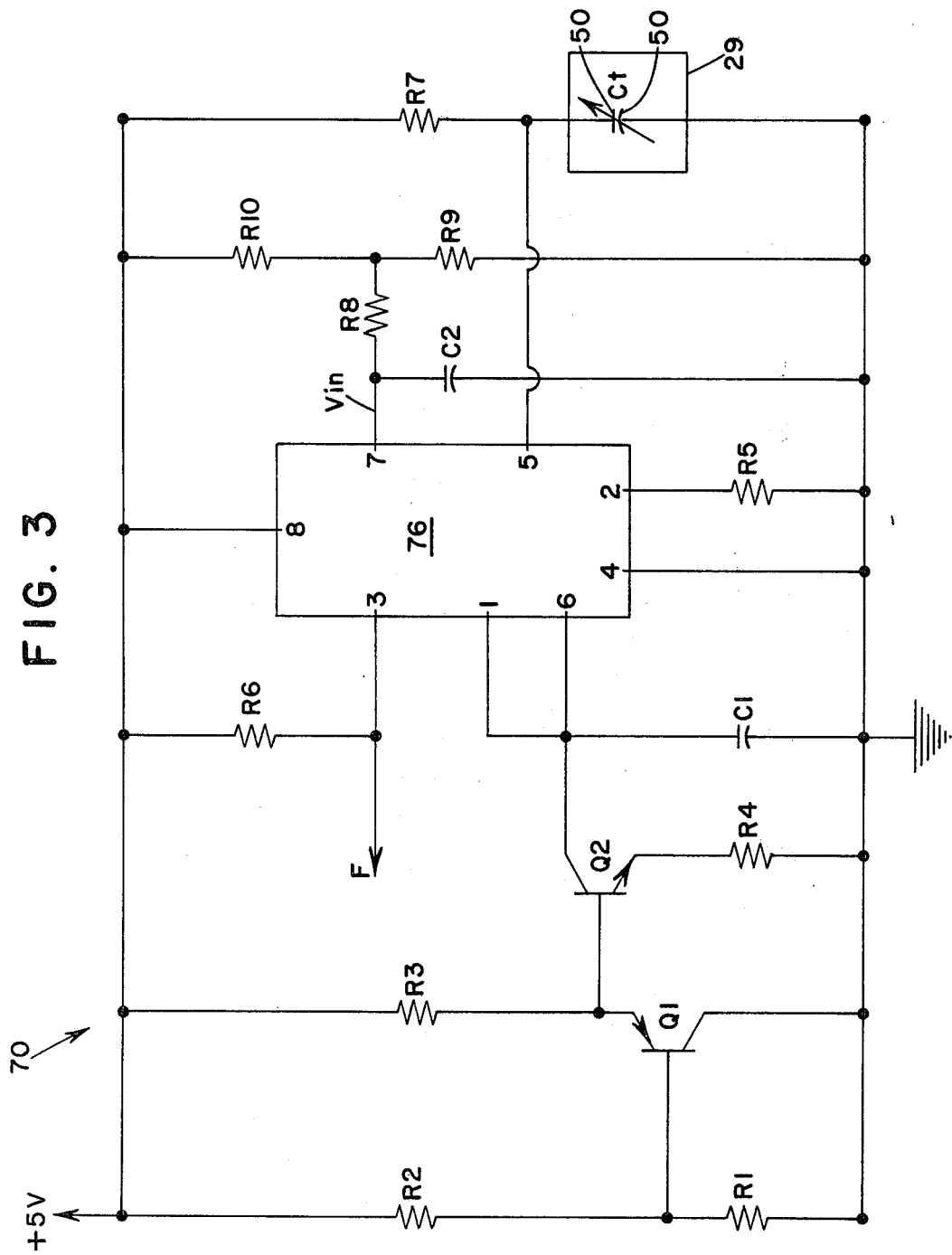
FIG. 3 is an electrical schematic of the signal conditioning circuit of this invention.

Referring to FIGS. 1 and 2, a strain or tension-measuring device 10 includes a pair of deformable members 12 and 13. Linkages 4 and 7 may be attached to opposite ends 17 and 18 of the device 10 so that the longitudinal tension in the linkages may be measured by the device 10. A bore 3 extends through end 17 so that a linkage 4 may be bolted thereto. A space is maintained in the end 18 via a spacer 5. A threaded bore 6, for receiving the other linkage 7, extends into the spaced end 18. The split ends of end 18 are clamped together by a bolt 8 to tightly grip the linkage 7 in the threaded bore 6. Deformable members 12 and 13 include laterally spaced-apart central portions 14 and 15, each with a centrally positioned threaded bore 16 extending laterally therethrough. Each bore 16 rotatably receives a threaded adjusting screw 19. The reduced diameter inner end 20 of each adjusting screw 19 is slip-fit into bores 22 which extend through spherical ball members 24.

A pair of identical rubber boots or seals 26 may be secured together by bolts 27 to enclose the volume circumscribed by the spaced-apart central portions 14 and 15 and to protect the enclosed volume from contamination from the environment. A groove 25 in the boots provides an exit path for an electrical cable (not shown) from circuit board 60. As best seen in FIG. 2, the boots 26 include a complimentary pair of recesses which cooperate to define an alignment notch 28.

A capacitive transducer 29 is carried in the volume enclosed by the central portions 14 and 15 and the rubber boots 26. The transducer 29 includes a pair of identical generally disc-shaped electrically insulating supports 30 which may be formed of an insulating material such as plastic. Each support 30 includes a raised rim 32 with an alignment tab 34 extending radially from the outer peripheral surface thereof. Each support 30 also includes three evenly distributed larger raised cylindrical necks 36 (two of which are shown in FIG. 1) extending from the outwardly facing side thereof. Each support 30 also includes three smaller necks 37 (two of which are shown in FIG. 1) extending from the inwardly facing side thereof in axial alignment with necks 36. Alignment bores extend laterally through the supports 30 and the necks 36 and 37. Each bore includes a smaller diameter portion 38 interconnecting larger diameter portions 35. Each inwardly located larger diameter bore portion 35 receives a compression spring 39 which is biased to urge the supports 30 apart. Each support 30 also includes a central raised cylindrical portion 41 on the side outwardly facing thereof. Each central raised portion includes a spherical socket 40 formed therein for pivotally receiving a corresponding one of the ball members 24 so that the supports 30 can pivot relative to their corresponding central portions 14 and 15. The adjusting screws 18 can be turned manually to adjust the spacing between the supports 30.

A pair of generally disc-shaped electrically conducting plates 50 are mounted by any suitable manner for movement with the supports 30. Each plate 50 includes three clearance bores 52, one of which is shown in FIG. 1, for lining up with the alignment bores 38 in the supports 30 and for registering with the corresponding small necks 37 of the support 30 to prevent rotation of the plates 50. Three alignment pins 56 extend through bore portions 35, 38 and 52 and slidably engage the walls of the smaller diameter portions 38 of the alignment bores in the supports 30. The alignment pins 56 cooperate with the walls of the bore portions 38 to maintain a parallel relationship between the plates 50. The plates 50 form the plates of a parallel plate variable capacitor Ct, the capacitance of which varies as a function of the separation between plates 50, and thus, as a function of the separation between central portions 14 and 15 of deformable members 12 and 13, and thus, as a function of the longitudinal tension applied to ends 17 and 18 of the sensor 10.

A circuit board 60 is supported by the rubber boots 26 in a position adjacent the transducer 29 and between the central portions 14 and 15 of the deformable members 12 and 13. The circuit 70 is assembled onto the circuit board 60, with the exception of the variable capacitor Ct.

A resistor R1 is coupled between ground and the base of grounded collector transistor Q1. A resistor R2 couples the base of Q1 to a regulated D.C. supply of +5 volts. A resistor R3 couples the emitter of Q1 with +5 volts. The emitter of Q1 is also coupled to the base of transistor Q2. A resistor R4 couples the emitter of Q2 with ground. The collector of Q2 is coupled to ground via capacitor C1 and is coupled to pins 1 and 6 of voltage-to-frequency (V/F) converter 76, such as National Semiconductor's LM231A. For a detailed description of the operation of V/F converter 76, the reader is referred to the manufacturer's specification literature for the LM231A.

Pin 2 of converter 76 is grounded via resistor R5. Pin 3 is connected to +5 volts via resistor R6. Pin 4 is grounded. Pin 5 is coupled to +5 volts via resistor R7 and is coupled to ground via variable capacitor Ct of transducer 29. Pin 7 is coupled to ground via capacitor C2. Pin 7 is also coupled to ground via series connected resistors R8 and R9 and is coupled to +5 volts via series connected resistors R8 and R10. Pin 8 is coupled to +5 volts.

MODE OF OPERATION

The circuit 70 is similar to a circuit suggested in the specification literature for the LM231A V1F converter. As described in that literature, the converter 76 generates a square wave output signal at pin 3 with a frequency F defined by the equation:

$$F \sim 1/(R7 \times Ct) \quad [1]$$

The lateral separation between the central portions 14 and 15 of the deformable members 12 and 13 is proportional to the amount of longitudinal tension applied to ends 17 and 18 tending to pull the ends apart. The plates 50 of variable capacitor Ct move with their respective central portions 14 and 15 and thus, the separation d, between the plates 50, may be described by the following equation:

$$d \sim k_1 \times T. \quad [2]$$

where T is the tension and $k_1$ is a constant.

It is well known that the capacitance Ct of a closely spaced parallel plate capacitor is defined by the equation:

$$Ct = (\epsilon s) \div d. \quad [3]$$

where $\epsilon$ is the permittivity of the dialectric between the plates 50 and s is the area of the plates.

Combining and rearranging equations (1), (2), and (3), we derive:

$$F \sim T \times [k_1/(R7 \times \epsilon \times s)]$$

Thus, since the bracketed term $[k_1/(R7 \times \epsilon \times s)]$ is a constant, the sensor 10 and the circuit 70 cooperate to generate an output signal at pin 3 of V/F converter 76 with a frequency F which is directly proportional to the tension T.

Pin 6 of V/F converter 76 provides for a threshhold input to a comparator amplifier (not shown) which is internal to the converter 76. If the level of this threshhold input is uncompensated for temperature variations, then the output frequency F will be undesirably dependent upon the temperature of the converter 76.

As described hereinafter, the applicants have provided a temperature compensation feature for improving the operation of the basic circuit suggested in the LM231A specification literature. This improvement comprises the addition of transistors Q1 and Q2 as previously described. Transistors Q1 and Q2 are temperature sensitive. Their respective gains vary with changes in temperature to vary the D.C. level of a threshhold voltage applied to pin 6 to compensate for temperature variations internal to the converter 76.

We claim:

1. A sensor for sensing tension in load bearing members, the sensor comprising:
    a deformable member with first and second ends for connecting to respective load bearing members, the deformable member having a pair of laterally spaced-apart central portions interconnecting the first and second ends, the deformable member being deformable to vary the separation of the central portions as a function of longitudinal tension applied to the load bearing members;
    a capacitive transducer comprising a first capacitor plate movable with one of the central portions and a second capacitor plate spaced apart from the first capacitor plate, movable with the other central portion and movable relative to the first capacitor plate, the capacitor plates cooperating to define a variable capacitance therebetween; and
    pivot means for pivotally coupling each plate to its corresponding central portion.

2. The sensor of claim 1, further comprising:
    resilient means engagable with the spaced-apart portions for enclosing a space therebetween and for protecting the space from contamination, the capacitive transducer being disposed within the space.

3. The sensor of claim 1, further comprising:
    a circuit coupled to the transducer and positioned between the central portions adjacent the transducer, the circuit comprising means for generating an output signal with a frequency which varies as a function of the variable capacitance of the transducer, the circuit also comprising temperature compensating means for compensating for variations in the ambient temperature.

4. The sensor of claim 3, further comprising:
    resilient means engagable with the spaced-apart portions for enclosing a space therebetween and for protecting the space from contamination, the capacitive transducer and the circuit being disposed within the space, the resilient means supporting the circuit in spaced-apart relationship to the capacitive transducer.

5. A sensor for sensing tension in load bearing members, the sensor comprising:
    a deformable member with first and second ends for connecting to corresponding load bearing members, the deformable member having a pair of laterally spaced-apart central portions interconnecting the first and second ends, the deformable member being deformable to vary the separation of the central portions as a function of longitudinal tension applied to the load bearing members;
    a capacitive transducer comprising a pair of electrically insulating supports, each movable with a respective one of the central portions, and a pair of spaced-apart capacitor plates, each support member supporting one of the capacitor plates; and alignment means engageable with the supports for maintaining a parallel relationship between the capacitor plates, the alignment means comprising a plurality of cylindrically walled bores extending laterally through the supports and guide pins received by the bores and slidably engaging the walls of the bores.

6. The sensor of claim 5, wherein the capacitor plates include a plurality of bores extending therethrough, each guide pin extending through a respective one of the bores in each of the capacitor plates.

7. A sensor for sensing tension in load bearing members, the sensor comprising:

a deformable member with first and second ends for connecting to corresponding load bearing members, the deformable member having a pair of laterally spaced-apart central portions interconnecting the first and second ends, the deformable member being deformable to vary the separation of the central portions as a function of longitudinal tension applied to the load bearing members;

a capacitive transducer comprising a pair of electrically insulating supports, each movable with a respective one of the central portions, and a pair of spaced-apart capacitor plates, each support member supporting one of the capacitor plates; and pivot means for pivotally coupling at least one of the supports to its respective central portion, the pivot means comprising a ball member connected to the central portion and a socket formed on one side of the support, the socket pivotally receiving the ball.

8. The sensor of claim 7, further comprising:

adjusting means interconnecting the ball and the central portion for permitting manual adjustment of the separation between the capacitor plates.

9. A transducer comprising:

a deformable member with first and second ends and with a pair of laterally spaced-apart central portions interconnecting the ends, the central portions having a lateral separation which varies as a function of longitudinal tension applied to the ends of the deformable member;

a pair of electrically insulating supports, each support being movable with a respective one of the central portions, each support having a spherical socket formed on one side thereof; the supports having a plurality of bores extending laterally therethrough;

a pair of ball members, each ball member being pivotally received by a respective one of the spherical sockets;

adjustable means interconnecting at least one of the ball members and a respective one of the central portions for permitting manual adjustment of separation between the one ball member and the respective central portion;

a pair of electrically conducting plates, each plate being supported on the other side of a respective one of the insulating supports, the pair of conducting plates forming the plates of a variable capacitance; and a plurality of guide pins slidably received by the bores in the insulating supports, the guide pins and the bores cooperating to maintain a parallel relationship between the conducting plates.

10. A sensor for sensing tension in load bearing members, the sensor comprising:

a deformable member with first and second ends for connecting to respective load bearing members, the deformable member having a pair of laterally spaced-apart central portions interconnecting the first and second ends, the deformable member being deformable to vary the separation of the central portions as a function of longitudinal tension applied to the load bearing members;

transducer means coupled between the central portions for varying an electrical parameter in response to changes in the separation of the central portions;

a circuit coupled to the transducer means comprising means for generating an output signal with a characteristic which varies as a function of the variable parameter; and resilient means engagable with the spaced-apart portions for enclosing a space therebetween and for protecting the space from contamination, the transducer means and the circuit being disposed within the space, the resilient means supporting the circuit in spaced-apart relationship to the transducer means.

* * * * *